United States Patent

Martinez et al.

(10) Patent No.: US 12,552,423 B2
(45) Date of Patent: Feb. 17, 2026

(54) SYSTEM FOR MONITORING A WHEEL-RAIL CONTACT FORCE

(71) Applicant: Aktiebolaget SKF, Gothenburg (SE)

(72) Inventors: Victor Martinez, Madrid (ES); Elena Pinto, Alcorcón-Madrid (ES)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/158,410

(22) Filed: Jan. 26, 2021

(65) Prior Publication Data

US 2021/0284206 A1 Sep. 16, 2021

(30) Foreign Application Priority Data

Mar. 12, 2020 (EP) ..................................... 20380012

(51) Int. Cl.
*B61K 9/08* (2006.01)
*B61L 15/00* (2006.01)

(52) U.S. Cl.
CPC ............ *B61K 9/08* (2013.01); *B61L 15/0072* (2013.01)

(58) Field of Classification Search
CPC ... B61K 9/08; B61L 15/0072; B61L 15/0081; B61L 23/042; B61L 27/60
See application file for complete search history.

(56) References Cited

U.S. PATENT DOCUMENTS

| | | | | |
|---|---|---|---|---|
| 6,668,239 | B1 * | 12/2003 | Gilbert | .................. B61L 23/047 |
| | | | | 702/34 |
| 2009/0076742 | A1 * | 3/2009 | Xia | .......................... B61K 9/08 |
| | | | | 702/41 |
| 2017/0267263 | A1 * | 9/2017 | Pinto | ..................... B61L 23/048 |
| 2020/0134943 | A1 * | 4/2020 | Inagaki | ..................... G07C 5/02 |

FOREIGN PATENT DOCUMENTS

| | | | |
|---|---|---|---|
| AU | 2004200527 A1 | * | 9/2004 |
| CN | 104006978 A | | 8/2014 |
| CN | 108536930 A | | 9/2018 |
| EP | 3219574 A1 | | 9/2017 |
| WO | 2006130908 A1 | | 12/2006 |

OTHER PUBLICATIONS

M. Dehghani, Z. Montazeri, A. Dehghani and A. Seifi, "Spring search algorithm: A new meta-heuristic optimization algorithm inspired by Hooke's law," 2017 IEEE 4th International Conference on Knowledge-Based Engineering and Innovation (KBEI), 2017, pp. 0210-0214, doi: 10.1109/KBEI.2017.8324975. (Year: 2017).*

(Continued)

*Primary Examiner* — Michael J Dalbo
(74) *Attorney, Agent, or Firm* — The Garcia-Zamor Law Firm; Ruy Garcia-Zamor

(57) ABSTRACT

A system for monitoring a wheel-rail contact force, the system providing a measuring unit for measuring a vertical acceleration of a wheel being connected to a bogie. The wheel is configured to run on a rail. The system includes a calculation unit for simulating a wheel-rail interaction using the measured vertical acceleration and for calculating a wheel-rail contact force based on the simulated wheel-rail interaction. Also, a method for the same.

7 Claims, 2 Drawing Sheets

(56) References Cited

OTHER PUBLICATIONS

Gullers, High-frequency vertical wheel-rail contact forces—Field measurements and influence of track irregularities, Wear 265 (2008) 1472-1478 (Year: 2008).*
Barbosa (BR 102013019072), English Translation (Year: 2015).*
Sohn (KR 20180082674), English Translation (Year: 2018).*
Wei, L. et al. Safety analysis of high speed trains under cross winds using indirect wheel-rail force measuring method. Journal of Wind Engineering and Industrial Aerodynamics. Dec. 2018, vol. 183, pp. 55-67. ISSN 0167-6105.*§2.1 ; §2.2 ; Fig. 1 ; Fig. 2 ; Fig. 6b*.

* cited by examiner

SYSTEM FOR MONITORING A WHEEL-RAIL CONTACT FORCE

CROSS-REFERENCE TO RELATED APPLICATIONS

This application claims priority to European Patent Application no. 20380012.3, filed Mar. 12, 2020, the contents of which is fully incorporated herein by reference.

TECHNICAL FIELD OF THE INVENTION

The present invention relates to a system for monitoring a wheel-rail contact force. The present invention further relates to a method for monitoring a wheel-rail contact force.

BACKGROUND OF THE INVENTION

In the field of rail vehicles, it is helpful to know the contact forces between the rail and the wheels of a bogie of a rail vehicle, like a train, in order to learn about the behavior of the vehicle and its components. Such information may be used by the vehicle maintainers and designers for improving the rails and/or vehicles. Also, for the manufacturers of axle box bearings, it is important to know if the calculated load values are corresponding with the values in the reality.

In known systems, the interaction between the rails and the wheels is monitored by using special instrumented wheelsets, which are only temporarily and not permanently installed. In order to monitor the interaction between the rail and the wheelsets, it is necessary to remove the wheelset, install all the instrumentation, take the measurements during a period of time and then remove everything.

It is therefore an object of the present invention to provide a simplified way for monitoring the forces at a wheel-rail contact.

SUMMARY OF THE INVENTION

This object is solved by a system for monitoring a wheel-rail contact force and a method for monitoring a wheel-rail contact force.

The system for monitoring a wheel-rail contact force comprises a measuring unit for measuring a vertical acceleration of the wheel being connected to the bogie. The bogie is part of a rail vehicle that runs on the rail. The bogie may comprise, for example four wheels, wherein an axle box on the bogie supports one wheel of the bogie.

The system further comprises a calculation unit for simulating a wheel-rail interaction using the measured vertical acceleration. Further, the calculation unit is configured to calculate a wheel-rail contact force based on the simulated wheel-rail interaction. Based on this simulation, it is not necessary to measure the speed or velocity of the bogie as the calculation of the wheel-rail contact force is only based on the simulation using a measured vertical acceleration. Using such a measurement, it is not necessary to install a temporary instrumented wheelset, as the required measurement elements can be permanently installed at the wheel of the bogie.

According to an embodiment, the measuring unit is adapted to measure the acceleration of the wheel by measuring the acceleration of an axle box being connected to the wheel. For example, the measuring unit may be adapted to measure one acceleration signal per axle box, for example, using one acceleration sensors per axle box. Thus, the vertical acceleration is measured at an axle box on the bogie, which supports a wheel that runs on the rail and is thus influenced by undulations or corrugations in the rail surface.

The calculation unit may be further adapted to transform the vertical acceleration of the wheel into a vertical speed of the wheel. In contrast to known systems, it is thus not necessary to measure a speed or velocity, but the vertical acceleration may directly be used for further processing and determination of the contact forces. It should be noted that, throughout the specification, the terms "velocity" and "speed" are synonymously used.

The dynamic behavior of the bogie may be simulated using a suitable model of the bogie, for example, a quarter bogie model. In particular, the calculation unit may be adapted to simulate at 2 mass model of a quarter bogie. The corresponding equations of motion of the bogie rail system may then be solved using known mass parameters, stiffness parameters and damping parameters of the system, as well as the measured acceleration signal.

Thus, the vertical acceleration signal (acc1) is used directly to solve the equations of motion associated with the model. Furthermore, this signal is subjected to only one integration process, to obtain the vertical velocity signal (vel1), which is also used as an input for solving the equations. This may provide the benefit that the calculated vertical profile signal z therefore contains minimal noise and has a high degree of accuracy.

The 2-mass model may be based on a sprung mass of the bogie, primary suspension parameters, an unsprung mass of the wheels and a wheel-rail contact stiffness. Here, it is assumed that the axle box, which forms part of the unsprung mass of the bogie, is connected via a primary suspension to a second mass, which is the spring mass.

In the following, an example of such a 2-mass model will be described. It should be noted that the described 2-mass model is only exemplary and may be adjusted when necessary.

The equations of motion for the quarter-bogie model in the time domain are as follows:

$$m2\ddot{y}2 + c2(\dot{y}2 - \dot{y}1) + k2(y2 - y1) = 0 \qquad [1]$$

$$m1\ddot{y}1 - c2\ddot{y}2 + c1\dot{y}1 - k2y2 + (k1+k2)y1 - k1z = 0 \qquad [2]$$

The accelerometer measures the vertical acceleration of the unsprung mass m1, meaning that the vertical acceleration signal acc1 is equivalent to $\ddot{y}1$. The vertical velocity signal vel1, that is obtained from acc1, is therefore equal to $\dot{y}1$. Further known parameters are the masses m1 and m2 (kg), the spring coefficient k2 (N/m) and damping coefficient c2 of the primary suspension and the spring coefficient k1 (N/m) of the wheel contact stiffness.

First, equation [1] is solved using the vertical velocity signal vel1.

Suitably, state variables x1, x2 and x3 are defined, whereby:

x1=y1 (vertical displacement of m1), implying that $\dot{x}1$=vel1.

x2=y2 (vertical displacement of m2).

x3=$\dot{x}2$, which implies that x3=$\dot{y}2$ (vertical velocity of m2).

Equation [1] may therefore be expressed in state-variable form as:

$$m2\dot{x}3 + c2(x3 - vel1) + k2(x2 - x1) = 0$$

such that $$\dot{x}3 = \frac{k_2}{m_2}x_1 - \frac{k_2}{m_2}x_2 - \frac{c_2}{m_2}x_3 + \frac{c_2}{m_2}vel_1$$

Using known stiffness and damping matrices, equation [1] can be solved as follows:

$$\begin{bmatrix}\dot{x}_1\\\dot{x}_2\\\dot{x}_3\end{bmatrix} = \begin{bmatrix}0 & 0 & 0\\0 & 0 & 1\\\frac{k_2}{m_2} & -\frac{k_2}{m_2} & -\frac{c_2}{m_2}\end{bmatrix}\begin{Bmatrix}x_1\\x_2\\x_3\end{Bmatrix} + \begin{Bmatrix}1\\0\\\frac{c_2}{m_2}\end{Bmatrix}vel_1$$

$$\begin{bmatrix}y_1\\y_2\\y_3\end{bmatrix} = \begin{bmatrix}1 & 0 & 0\\0 & 1 & 0\\0 & 0 & 1\end{bmatrix}\begin{Bmatrix}x_1\\x_2\\x_3\end{Bmatrix} + \begin{Bmatrix}0\\0\\0\end{Bmatrix}vel_1$$

to obtain the vertical displacement y1 of the unsprung mass m1, the vertical displacement y2 of the sprung mass m2 and the vertical velocity ẏ2 of the sprung mass m2.

Equation [2] can now be solved for the function z:

$$z = \frac{m}{k_1}acc_1 + \frac{c_2}{k_1}vel_1 + \frac{(k_1+k_2)}{k_1}\dot{y}_2 - \frac{k_2}{k_1}y_2$$

Once z if obtained, value can be used to calculate the force at the wheel-rail contact.

$F_1 = -k_1(desp_1-z)$ $F_1 = m_1acc_1 + c_2vel_1 - k_1y_1 + (k_1+k_2)\dot{y}_2 - k_2y_2$ Using the above described system and method, it is possible to provide a cheap wheel-rail contact force condition monitoring approach, which can be integrated in existing condition monitoring systems which take acceleration measures in the axle box. Such a monitoring of a wheel-rail contact force may be used for identifying potentially harmful corrugations that may require repair or maintenance. Such an identification of corrugations may be forwarded to an operator of the rail vehicle or the rail system to take corresponding measurements.

A further aspect of the invention relates to a method for monitoring a wheel-rail contact force. The method comprises the following steps: measuring a vertical acceleration of a wheel being connected to a bogie, simulating a wheel-rail interaction using the measured vertical acceleration and calculating a wheel-rail contact force based on the simulated wheel-rail interaction.

An even further aspect of the present invention relates to a computer program product comprising a computer program code which is adapted to prompt a control unit, e.g. a computer, and/or a computer of the above discussed monitoring system to perform the above discussed steps.

The computer program product may be a provided as memory device, such as a memory card, USB stick, CD-Rom, DVD and/or may be a file which may be downloaded from a server, particularly a remote server, in a network. The network may be a wireless communication network for transferring the file with the computer program product.

Further preferred embodiments are defined in the dependent claims as well as in the description and the figures. Thereby, elements described or shown in combination with other elements may be present alone or in combination with other elements without departing from the scope of protection.

In the following, preferred embodiments of the invention are described in relation to the drawings, wherein the drawings are exemplarily only, and are not intended to limit the scope of protection. The scope of protection is defined by the accompanied claims, only.

BRIEF DESCRIPTION OF THE DRAWINGS

The figures show.

In the following same or similar functioning elements are indicated with the same reference numerals.

DETAILED DESCRIPTION OF SOME EMBODIMENTS

Figure 1:
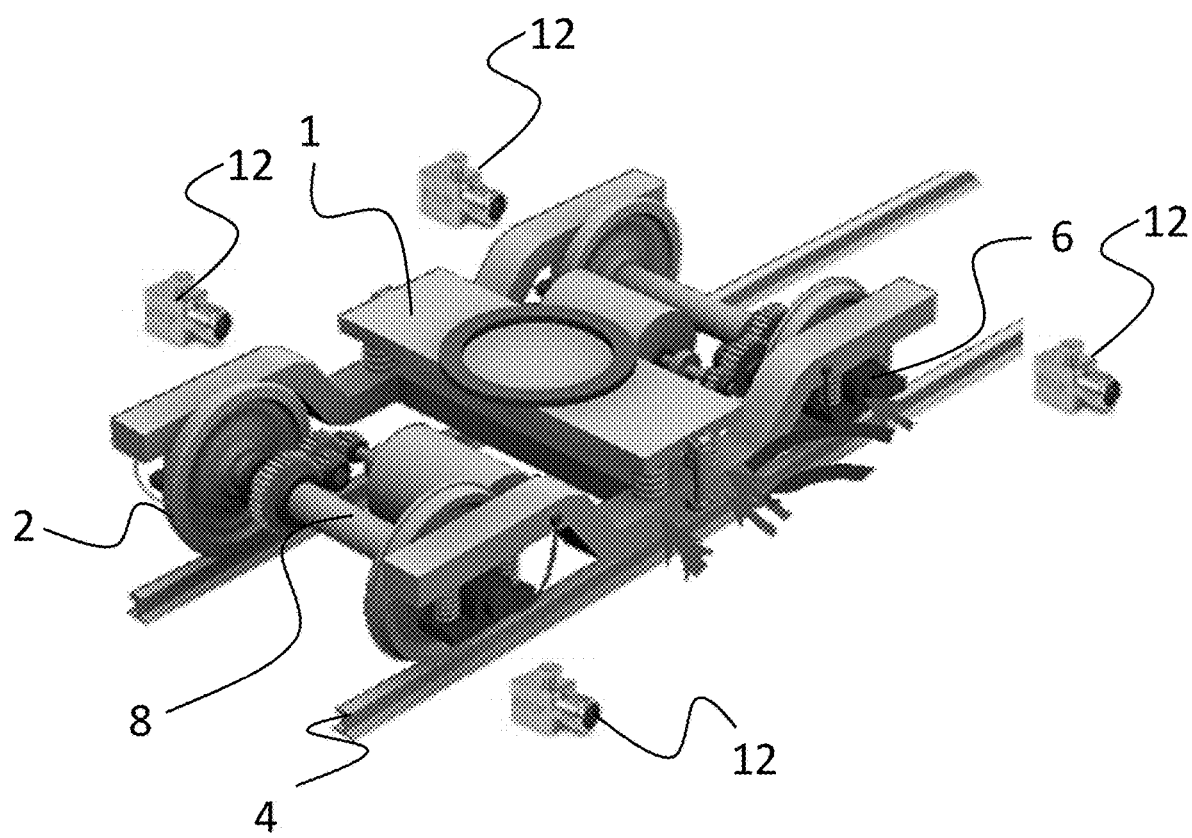
FIG. 1: a perspective view of a part of a bogie being arranged on rails.

FIG. 1 shows a part of a bogie 1 which comprises four wheels 2 being situated on rails 4. The bogie 1 is a bogie of a rail vehicle that runs on the rails 4. The wheels 2 are supported by an axle box 6 being coupled via an axle 8.

In order to monitor a wheel-rail contact force, a system 10 (illustrated in FIG. 2) may be used for measuring a vertical acceleration of the wheel 2. Therefore, one acceleration sensor 12 is arranged at each wheel 2.

Figure 2:
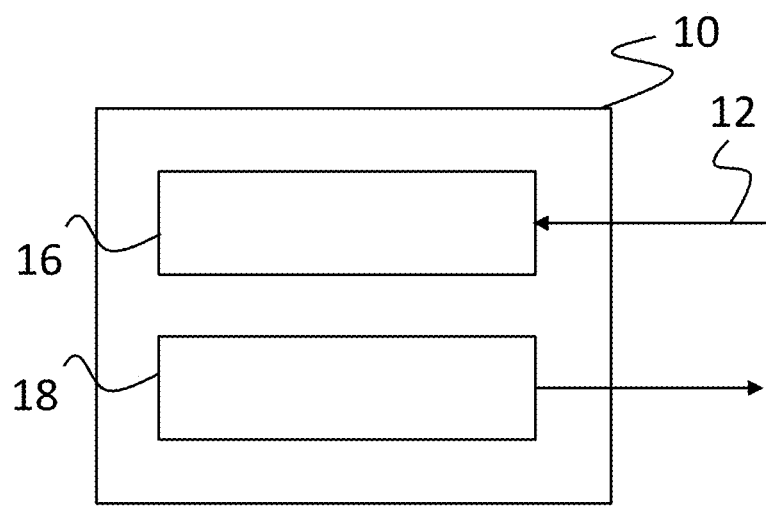
FIG. 2: a schematic block diagram of a system for monitoring a wheel-rail contact force of the bogie of FIG. 1.

FIG. 2 shows a schematic block diagram of the system 10 for monitoring the wheel-rail contact force. The system 10 comprises a measuring unit 16, which may include the sensor 12 as shown in FIG. 1. The sensor may be, for example, one acceleration sensor 12 per wheel 2.

The system 10 further comprises a calculation unit 18. The calculation unit 18 may receive the measured vertical acceleration as input signal 26 and may simulate a wheel-rail interaction using the measured vertical acceleration. Further, the calculation unit 18 may calculate the wheel-rail contact forces based on the simulated wheel-rail interaction.

Figure 3:
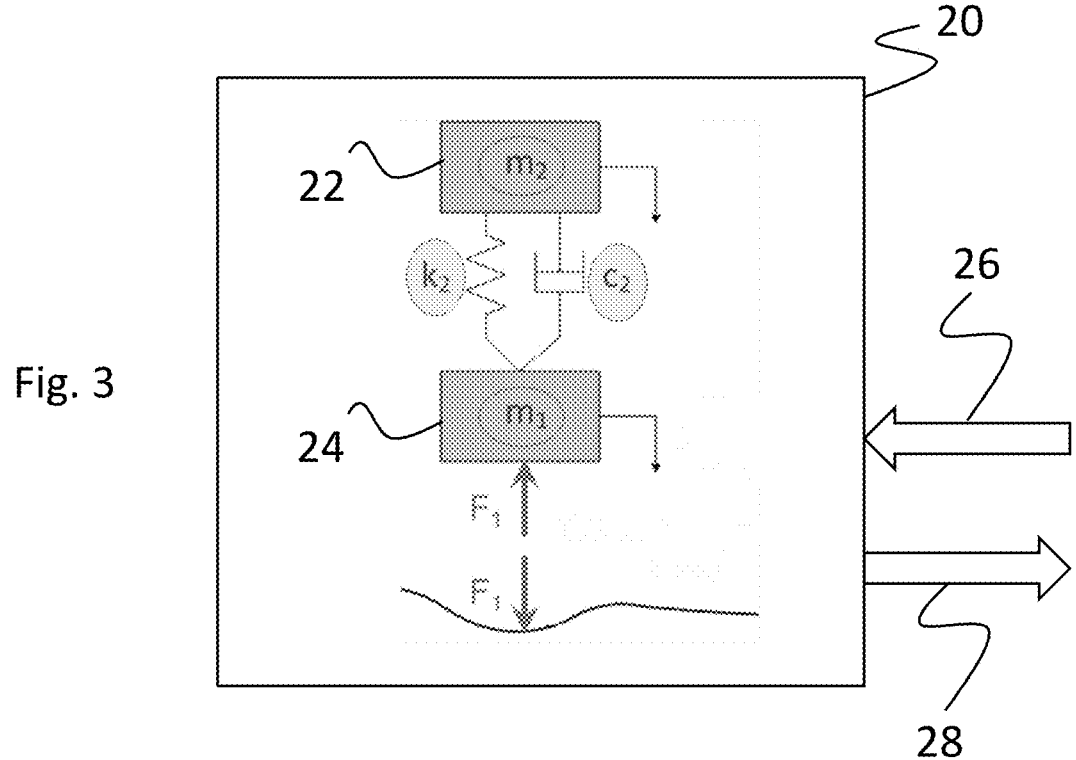
FIG. 3: a schematic diagram of the mass model used in the system of FIG. 2.

For simulating the wheel-rail interaction, the calculation unit 18 may use a simulation model, as shown in FIG. 3.

The simulation model 20 as shown in FIG. 3 uses a sprung mass 22, which is the sprung mass of the bogie 1, primary suspension parameters $k_2$ and $c_2$, an unsprung mass 24, which is the mass of the wheelset, and a wheel-rail contact stiffness. Further, the simulation model uses the measured vertical acceleration. Based on these parameters, the simulation model 20 simulates a behavior of the bogie 1. This simulation model 20 may be used to determine the wheel-rail contact forces F1. For this purpose, only one measured input parameter 26, i.e. the vertical acceleration, is needed.

In a first step, the calculation unit 18 transforms the measured vertical acceleration of the wheel 2 into a vertical velocity of the wheel 2. Thus, the simulation model of FIG. 3 uses as input the vertical velocity of the wheel 2 which is based on the measured acceleration.

Based on the 2-mass model and the dynamic parameters of the bogie 1 as well as the measured signal, the calculation unit 18 calculates a wheel-rail contact force F1 based on a simulated wheel-rail interaction which may be forwarded for further processing as output 28. This information may then be used to monitor the wheel-rail contact forces and to identify defects on the rails or the wheels.

Using the above described system and method, it is possible to provide a cheap wheel-rail contact force condition monitoring as only one parameter, i.e. the acceleration, needs to be measured. Such a monitoring forces at a wheel-rail contact may be used for identifying potentially harmful corrugations that may require repair or maintenance.

The invention claimed is:

1. A system for monitoring a wheel-rail contact force for a railcar vehicle, the system comprising:
   a measuring unit for directly measuring a vertical acceleration of a wheel connected to a bogie, the wheel being configured to run on a rail, wherein the measuring unit is adapted to measure the vertical acceleration of the wheel by measuring the vertical acceleration of an axle box connected to the wheel,
   a calculation unit for simulating a wheel-rail interaction, which does not use a linear speed or velocity of the bogie, the axle box, or the railway vehicle as input and which requires only one measured parameter which is the vertical acceleration of the axle box, but can use other non measured parameters for calculating a wheel-rail contact force based on the simulated wheel-rail interaction, the calculation unit directly uses the vertical acceleration directly to perform needed calculations and the vertical acceleration is subjected to only one integration process, to form a vertical velocity which is used as input to solve equations to determine the wheel rail contact force, wherein the calculation unit is adapted to simulate a two-mass model of a quarter bogie, wherein the calculation unit determines the wheel rail contact force without using any data from any other axle boxes which are part of the same railcar vehicle,
   wherein an output of the system is the wheel-rail contact force for each wheel of the bogie, the output identifies potentially harmful defects at the level of the individual wheel connected to the axle box being measured for maintenance.

2. The system of claim 1, wherein the calculation of the wheel-rail contact force is only based on the simulation, which is performed by the calculation unit, using the measured vertical acceleration.

3. The system of claim 2, wherein the measuring unit comprises an acceleration sensor.

4. The system of claim 1, wherein the calculation unit is adapted to transform the vertical acceleration of the wheel into a vertical velocity of the wheel.

5. The system of claim 1, wherein the two-mass model is based on a sprung mass of the bogie and a coach, primary suspension parameters, an unsprung mass of the wheels and a wheel-rail contact stiffness.

6. A method for monitoring a wheel-rail contact force of a railcar vehicle, the method comprising:
   measuring a vertical acceleration of a wheel connected to a bogie, the wheel running on a rail, wherein the measuring of the vertical acceleration of the wheel is accomplished by measuring the vertical acceleration of an axle box connected to the wheel, and
   simulating a wheel-rail interaction, which does not use a linear speed or velocity of the bogie, the axle box, or the railway vehicle as input and which requires only one measured parameter which is the vertical acceleration of the axle box, but can include other non measured parameters to calculate a wheel-rail contact force based on the simulated wheel-rail interaction while directly using the vertical acceleration to perform needed calculations, during which calculations the vertical acceleration is subjected to only one integration process, to form a vertical velocity which is used as input to solve equations to determine the wheel rail contact force, wherein the calculations simulate a two-mass model of a quarter bogie, wherein the calculations determine the wheel rail contact force of an individual wheel attached to the axle box being measured without using any data from any other axle boxes which are part of the same railcar vehicle, and
   outputting an output which is the wheel-rail contact force of the bogie, the output identifies potentially harmful defects at the level of an individual wheel connected to the axle box being measured for maintenance.

7. A system for monitoring a wheel-rail contact force of a railcar vehicle, the system comprising:
   a measuring unit for measuring a vertical acceleration of a wheel connected to a bogie, the wheel being configured to run on a rail, wherein the measuring unit is adapted to measure the vertical acceleration of the wheel by measuring the vertical acceleration of an axle box connected to the wheel, and
   a calculation unit for simulating a wheel-rail interaction, which does not use a linear speed or velocity of the bogie, the axle box, or the railway vehicle as input and which requires only one measured parameter which is the vertical acceleration of the axle box, but can use other non measured parameters for calculating a wheel-rail contact force based on the simulated wheel-rail interaction, the calculation unit is adapted to transform the vertical acceleration of the wheel into a vertical velocity of the wheel, the calculation unit is adapted to simulate a two-mass model of a quarter bogie based on a sprung mass of the bogie and a coach, primary suspension parameters, an unsprung mass of the wheels and a wheel-rail contact stiffness, the calculation unit directly uses the vertical acceleration directly to perform needed calculations and the vertical acceleration is subjected to only one integration process, to form a vertical velocity which is used as input to solve equations to determine the wheel rail contact force, wherein the calculation unit is adapted to simulate a two-mass model of a quarter bogie, wherein the calculation unit determines the wheel rail contact force of an individual wheel attached to the axle box being measured without using any data from any other axle boxes which are part of the same railcar vehicle, and
   wherein an output of the system is the wheel-rail contact force of the bogie, the output identifies potentially harmful defects at the level of an individual wheel connected to the axle box being measured for maintenance.

* * * * *